UNITED STATES PATENT OFFICE.

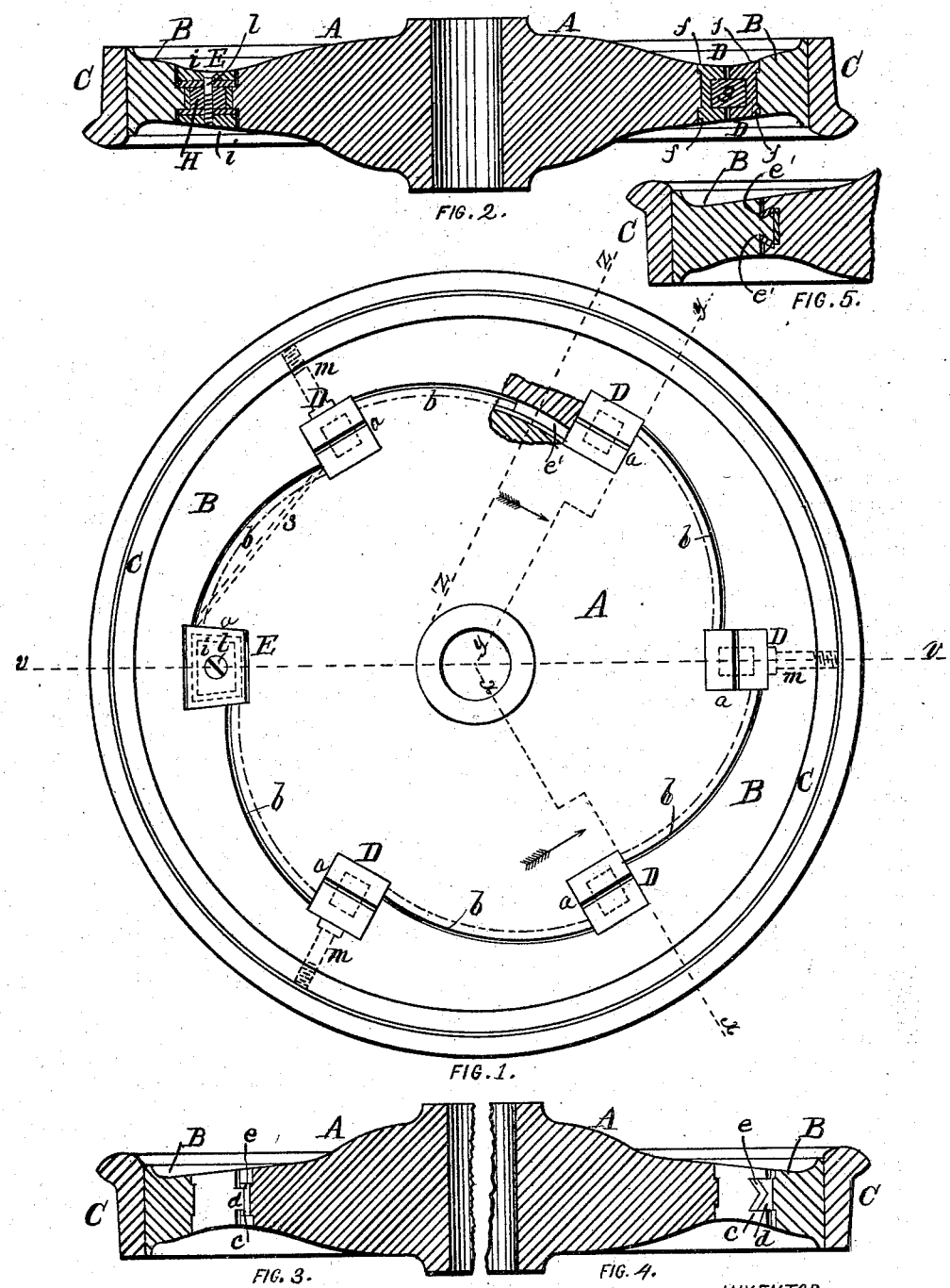

GEORGE E. WOODBURY, OF CAMBRIDGE, ASSIGNOR OF ONE-HALF HIS RIGHT TO AUGUSTUS N. CLARK, OF BEVERLY, MASSACHUSETTS.

IMPROVEMENT IN ELASTIC CAR-WHEELS.

Specification forming part of Letters Patent No. 174,051, dated February 22, 1876; application filed January 12, 1876.

*To all whom it may concern:*

Be it known that I, GEORGE E. WOODBURY, of Cambridge, in the county of Middlesex and State of Massachusetts, have invented certain new and useful Improvements in Elastic Car-Wheels, of which the following is a specification:

My invention relates to the formation and construction of the several parts constituting the wheel, and the manner of securing them together; and it consists, first, in constructing a car-wheel with a hub or central portion, an annular ring fitted to and secured upon the periphery of said hub portion, with a packing of rubber or other suitable elastic material interposed between them, and a tire constructed separately from, but secured to, said annular ring by bolts, or by shrinking it thereon, or by both bolts and shrinking combined.

My invention further consists in making the periphery of the hub portion of the wheel and the inner periphery of the annular ring or tire portion to consist of a series of short radial or nearly radial surfaces, alternating with an equal number of eccentrically curved or straight surfaces, connecting the outer end of one radial surface with the inner end of the next radial surface in such a manner as to form on the outer surface of the hub portion and the inner circumference of the annular ring or tire portion a series of hooked teeth, the outlines of which shall be parallel to each other when the two parts are placed together, and so that, when the tire portion or the annular ring is turned about its axis till the radial portion of each tooth on it shall come in contact with the radial surface of a tooth on the hub portion, there shall be sufficient space between each pair of curved or straight surfaces connecting said radial surfaces for the convenient insertion of a rubber or other elastic packing, and when the tire portion is rotated about the axis of the wheel in a direction opposite to its previous rotation, so as to compress the rubber or other packing interposed between said curved or straight surfaces, there shall be a space between each radial surface on the hub portion and the corresponding surface on the annular ring or tire portion, into which may be inserted a key or keys, to hold the parts in place and prevent expansion of the packing.

My invention further consists in the combination, with the hub portion of a car-wheel and an annular ring or tire portion, having their contiguous surfaces formed as above described, of one or more keys or chocks for holding the tire portion in place upon the hub portion, made in two parts, with the line of separation parallel to the axis and tangent to a circle described from said axis, each part being provided with a lip at each end, upon its outer surface, to lock onto or embrace the stock of the tire portion or hub portion of the wheel to hold them in, and a rubber or other spring inserted between the two parts to force them apart, and cause the lips to engage with the hub and tire portions of the wheel, and allow said parts to be moved toward each other to disengage said lips when it is desired to withdraw the keys.

My invention further consists in the combination, with the hub and tire portions of a car-wheel, made separate from each other, and having their contiguous surfaces formed as above described, of one or more keys or chocks, made in two or more parts, the line of division between which is parallel to the plane of revolution of the wheel, the several parts being firmly secured together and in place by means of one or more bolts passing through the same parallel to the axis of the wheel, and the outer portions of said keys or chocks being formed and arranged to embrace between them a portion of the stock of the hub and tire portions of the wheel, with rubber or other elastic packing inserted between the bearing-surfaces of said keys, upon the two parts of the wheel, and between the several parts of the key or chock, as will be described.

My invention further consists in providing the outer surface of each tooth on the hub portion of the wheel with a tongue or projecting rib, extending along said tooth in a direction at right angles to the axis of the wheel, and the outer surface of each tooth of the center or hub portion of the wheel with a corresponding groove, or vice versa, said tongues and grooves being so proportioned to each other as to allow for the thickness of the compressed rubber or other packing.

My invention further consists in constructing the outer edge of said tongues and the bottoms of the grooves V-shaped, one being the counterpart of the other, and interposing an elastic packing between said V-shaped surfaces, when said packing is compressed by rotating or moving one portion of the wheel about its axis while the other portion is retained in a fixed position, or moving both portions in opposite directions, as will be more fully described.

My invention further consists in locking the tire portion to the hub portion, to prevent its flying off or being separated from the hub portion in case of fracture of the tire portion, by making the tongues and grooves which hold the two parts of the wheel in place laterally of a dovetail form in cross-section, the widest part of the dovetailed tongue being no wider than the narrowest part of the dovetailed groove, so that they may be made to engage by the rotation of one of the parts of the wheel about the other part, for the purpose of compressing the packing placed between the parts, and driving a key or gib upon either side of the male dovetail to fill the space between it and the sides of the dovetailed groove, as will be described.

Figure 1 of the drawings is a side elevation of a car-wheel embodying my improvements. Fig. 2 is a section on line $v\ v$ on Fig. 1. Fig. 3 is a half-section on line $x\ x$ on Fig. 1, looking in the direction of the arrow. Fig. 4 is a half-section on line $y\ y$ on Fig. 1; and Fig. 5 is a partial section on line $z\ z$ on Fig. 1.

A is the hub portion or body of the wheel, the outer periphery of which consists of a series of teeth or projections resembling saw-teeth, the boundary-lines of which are a series of short radial lines, $a$, arranged at equal distances from the axis of the wheel and from each other, and a series of eccentric curved lines, $b\ b$, each of which connects the outer end of one of the lines $a$ with the inner end of the next line $a$, as shown.

The lines $b$ may be made straight instead of curved, as shown in dotted lines at 3, Fig. 1.

B is the annular ring or outer portion of the wheel, which may be made of cast or wrought iron, and may have the tire C formed in one piece with it, or made separately therefrom, and secured thereto by shrinking it upon the ring, or by bolts, or both combined.

The inner circumference of the ring B is made the exact counterpart of the exterior surface of the hub portion A.

A groove, $c$, is formed in the outer face of the teeth on the body of the wheel A, into which the tongue $d$, formed on the corresponding parts of the inner face of the annular ring B, fits, with the rubber packing $e$ interposed between the parts as shown. The outer edge of the tongue $d$ and the bottom of the groove $c$ may be straight or at right angles to their sides, as shown in Fig. 3, or V-shaped, as shown in Fig. 4, and the sides of the same parts may be parallel to each other, as shown in Figs. 3 and 4, or they may be made dovetailed, as shown in Fig. 5, in which case a gib or key, $e'$, is driven between the side of the groove and the tongue upon each side thereof, as shown, the gibs or keys $e'$ being of such a length that they can be entered between the radial shoulders of the two parts of the wheel when the packing has been properly compressed by the rotation of one part about the other.

D D are the keys or chocks for holding the tire portion of the wheel in its proper position on the hub portion after the packing has been suitably compressed by a partial rotation of one of the parts about the other, each of said keys being made in two parts, and each part having formed upon one of its sides two lips $f\ f$, which, when the keys are placed in position, engage with or hook onto the opposite sides of the annular ring, or the body of the wheel, and each of said parts is also recessed upon its opposite side to receive one end of the spring $g$, which may be made of rubber or any other suitable material, and is inserted between said two parts to force them apart after they have been driven into position between the shoulders $a\ a$, on the annular ring B, and the body, or hub portion A, to cause the lips $f\ f$ to engage with said ring and hub portion. By compressing the spring $g$ the two parts of the key may be brought into contact with each other, and the lips $f\ f$ disengaged from the ring and hub portions of the wheel, when the keys may be withdrawn.

Another form of key is shown at E, in which the line of separation between the parts, of which there may be two or three, is parallel to the plane of rotation of the wheel.

In the case shown the key consists of a central piece, $h$, and two side plates $i\ i$, made large enough to bear around their outer edges upon the tire and body portions of the wheel, as shown in Figs. 1 and 2, with elastic packing placed between the parts $h$ and $i$, and the whole secured together by one or more screw-bolts $l$.

The operation of my improvement is as follows: The hub portion A being placed within the annular ring B, in its proper plane with the radial surfaces $a$ of the hub portion, in contact with the corresponding radial surfaces on the tire portion, the rubber packing $e$ is placed in position, and one of the parts of the wheel is rotated about its axis, while the other part is held firmly in a fixed position until the rubber packing is sufficiently compressed and the radial shoulders on the hub and tire portions of the wheel are separated sufficiently far apart to receive the keys, which are then inserted by compressing the springs $g$ between the two parts thereof, and allowing them to expand again when the keys are in position.

As heretofore constructed, elastic car-wheels have been made entirely of cast-iron, or, when steel or wrought-iron tires have been used, the elastic packing has been placed between the tire and the body of the wheel, said packing extending in one piece entirely around the body of the wheel; but with a construction such as herein set forth it would be very expensive to make the outer rim and tire in one piece of steel or wrought-iron, and I therefore make the body of the wheel and the annular ring B of cast-iron; or the latter may be made of wrought-iron, and then shrink onto the ring B a tire of steel, which may be additionally secured by means of screw-bolts, as shown in dotted lines at $m$ $m$.

By this mode of construction a great saving is made in the first cost of the wheel, as compared with making the entire outer portion of the wheel of steel, and when the tire is worn out it can be readily removed from the ring B and another applied, with very little cost of labor, and without injury to the annular ring or hub portion of the wheel, or the elastic packing.

What I claim as new, and desire to secure by Letters Patent of the United States, is—

1. An elastic car-wheel, consisting essentially of a hub portion A, an annular ring B, with a rubber or other elastic packing interposed between said hub portion and annular ring, and a steel or wrought-iron tire, C, fitted and secured to said annular ring, substantially as and for the purposes described.

2. A car-wheel, consisting of a central or hub portion and an outer or tire portion, with rubber or other elastic material interposed between them when the line of division between said parts consists of a series of short radial lines, arranged around and equidistant from the axis of the wheel, and a series of curved or straight lines, each of which connects the outer end of one radial line with the inner end of the next radial line, substantially as described.

3. In combination with the hub and tire portions of a car-wheel having their contiguous surfaces made up of a series of radial lines and a series of eccentrically-curved or straight lines, connecting the outer and inner ends of said radial lines, as set forth, one or more keys, D, made in two parts and provided with lips $ff$, and having a spring, $g$, inserted between said parts, all constructed, arranged, and adapted to operate as and for the purposes described.

4. In combination with the hub and tire portions of a car-wheel, made separate from each other and having their contiguous surfaces formed as herein set forth, one or more keys or chocks E, made in two or more pieces, divided in a plane or planes parallel to the plane of revolution of the wheel, with rubber or other suitable elastic packing between said parts and between them and the tire and hub portions of the wheel, and one or more screw-bolts $l$ for binding the whole together, as and for the purposes described.

5. In combination with the hub and tire portions of a car-wheel, having their contiguous surfaces formed of a series of teeth, with elastic packing interposed between them, as herein set forth, the grooves $c$ and tongues $d$, adapted to engage with each other, as and for the purposes described.

6. In combination with the hub and tire portions of a car-wheel, having their contiguous faces formed of a series of teeth, with elastic packing interposed between them, as set forth, the tongue $d$, having its outer edge made V-shaped in cross-section, and the groove $c$, having its bottom also of V-shape to match the edge of the tongue $d$, as and for the purposes described.

7. In combination with the hub and tire portions of a car-wheel, having their contiguous surfaces composed of a series of teeth, with elastic packing between them, the tongue $d$ and groove $c$, made dovetailing and secured together by the gibs or keys $e'$, substantially as described.

Executed at Boston this 29th day of October, 1875.

GEORGE E. WOODBURY.

Witnesses:
WM. P. EDWARDS,
E. A. HEMMENWAY.